United States Patent
Issa et al.

(10) Patent No.: US 9,418,480 B2
(45) Date of Patent: Aug. 16, 2016

(54) SYSTEMS AND METHODS FOR 3D POSE ESTIMATION

(71) Applicants: Frida Issa, Haifa (IL); Pablo Garcia-Morato, Madrid (ES)

(72) Inventors: Frida Issa, Haifa (IL); Pablo Garcia-Morato, Madrid (ES)

(73) Assignee: Augmented Reailty Lab LLC, Coral Gables, FL (US)

( * ) Notice: Subject to any disclaimer, the term of this patent is extended or adjusted under 35 U.S.C. 154(b) by 0 days.

(21) Appl. No.: 13/633,800

(22) Filed: Oct. 2, 2012

(65) Prior Publication Data

US 2014/0092132 A1    Apr. 3, 2014

(51) Int. Cl.
| | |
|---|---|
| G09G 5/00 | (2006.01) |
| G06T 19/00 | (2011.01) |
| G06T 7/00 | (2006.01) |
| G02B 27/01 | (2006.01) |
| G06F 3/01 | (2006.01) |

(52) U.S. Cl.
CPC ............. *G06T 19/006* (2013.01); *G06T 7/0044* (2013.01); *G06T 7/0046* (2013.01); *G02B 27/017* (2013.01); *G06F 3/012* (2013.01); *G06T 19/00* (2013.01); *G06T 2207/10016* (2013.01)

(58) Field of Classification Search
CPC ....... G06T 19/006; G06T 19/00; G06F 3/011; G06F 3/012; G02B 27/017
USPC ......... 382/103, 153, 118, 128, 285, 106, 107, 382/201.209, 115; 345/633, 419, 156, 632, 345/629
See application file for complete search history.

(56) References Cited

U.S. PATENT DOCUMENTS

| | | | | |
|---|---|---|---|---|
| 6,937,745 | B2 * | 8/2005 | Toyama ......................... | 382/103 |
| 8,238,612 | B2 * | 8/2012 | Susca .................... | G06T 7/2033 348/154 |
| 8,531,519 | B1 * | 9/2013 | Peng ......................... | H04N 7/18 348/139 |
| 2003/0012410 | A1 * | 1/2003 | Navab et al. .................. | 382/103 |
| 2007/0122001 | A1 * | 5/2007 | Wang et al. .................... | 382/103 |
| 2008/0167814 | A1 * | 7/2008 | Samarasekera ....... | G01C 21/005 701/469 |
| 2008/0232645 | A1 | 9/2008 | Billinghurst et al. | |
| 2009/0279741 | A1 * | 11/2009 | Susca .................... | G06T 7/2033 382/107 |
| 2009/0295908 | A1 * | 12/2009 | Gharib ................. | G01B 11/002 348/46 |

(Continued)

OTHER PUBLICATIONS

Alberto Ruiz et al., "Robust Nomography Estimation from Planar Contour based on Convexity" European Conference on Computer Vision, pp. 107-120, 2006.

Andrew W. Fitzgibbon, "Robust Registration of 2D and 3D Point Sets" In Proc. British Machine Vision Conference, vol. II, pp. 411-420, 2001.

(Continued)

*Primary Examiner* — Abderrahim Merouan
(74) *Attorney, Agent, or Firm* — Norton Rose Fulbright US LLP

(57) ABSTRACT

The present system provides a tool to estimate the relative pose of a generic object with respect to a camera view-point by processing 2D images from a monocular camera in real-time. The capability of solving the pose estimation problem relies on the robust detection and matching in consecutive image frames of significant visual features belonging to an object of interest. To accomplish this, the system incorporates 3D modeling of the object of interest. In one embodiment, the shape of interest may be approximated by a parametric surface such as a cylinder, sphere, ellipsoid, or even complex non-parametric models. The system can restrain information retrieved at a 2D image level to estimate parameters about the pose. In operation, the accuracy of the 3D pose estimation of the object is a function of the degree of approximation of the selected model and the ability to select and track relevant features across consecutive image frames.

1 Claim, 4 Drawing Sheets

(56) References Cited

U.S. PATENT DOCUMENTS

| | | | |
|---|---|---|---|
| 2010/0092093 A1* | 4/2010 | Akatsuka et al. | 382/203 |
| 2012/0113145 A1* | 5/2012 | Adhikari et al. | 345/633 |
| 2012/0113274 A1* | 5/2012 | Adhikari et al. | 348/207.1 |
| 2012/0121130 A1* | 5/2012 | Kaminka | G06K 9/4671 382/103 |
| 2012/0290521 A1* | 11/2012 | Frank et al. | 706/45 |
| 2012/0314030 A1* | 12/2012 | Datta et al. | 348/44 |
| 2012/0327196 A1* | 12/2012 | Ohba et al. | 348/49 |
| 2013/0066750 A1* | 3/2013 | Siddique et al. | 705/27.2 |
| 2013/0182947 A1* | 7/2013 | Wang | G06T 7/0042 382/159 |
| 2013/0265392 A1* | 10/2013 | Rhee et al. | 348/46 |

OTHER PUBLICATIONS

Yehezkel Lamdan et al., "Object Recognition by Affine Invariant Matching" Technical Report No. 342, Robotics Report No. 136, pp. 1-25, 1987.

International search report dated Apr. 10, 2014 issued in corresponding PCT application PCT/US13/62214 cites the U.S. patent application publications listed above.

International Preliminary Report on Patentability dated Jun. 25, 2015, issued in related International Application No. PCT/US2013/062214.

* cited by examiner

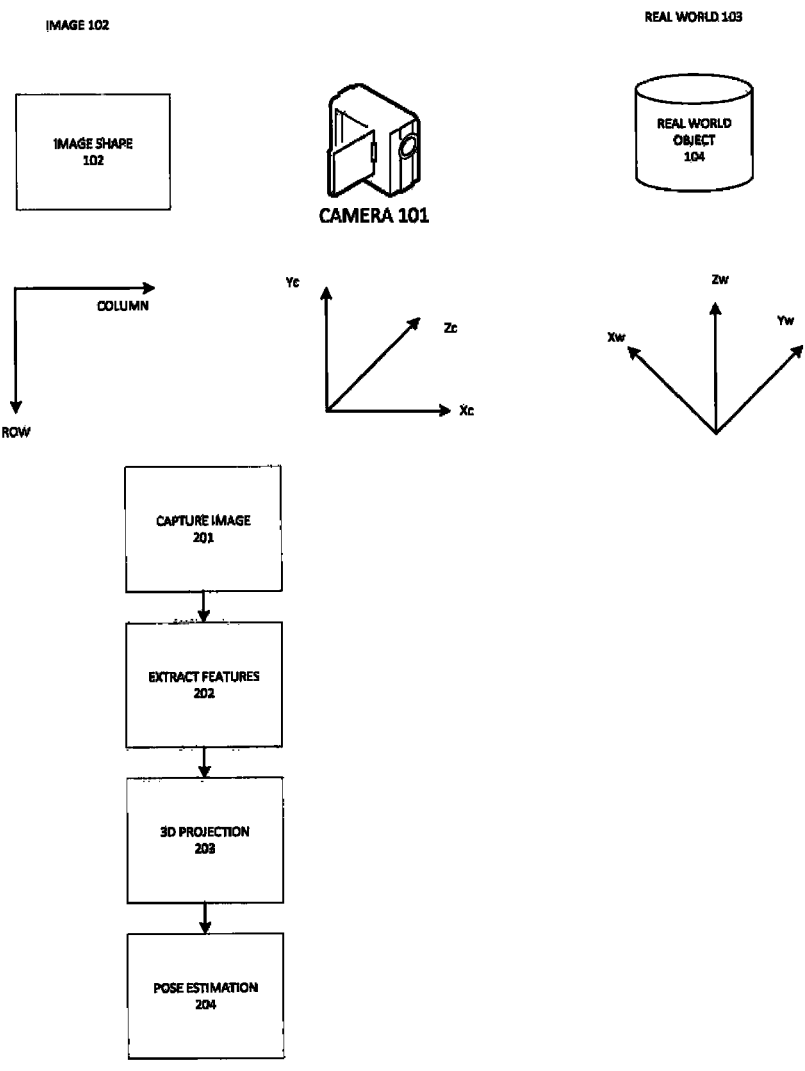

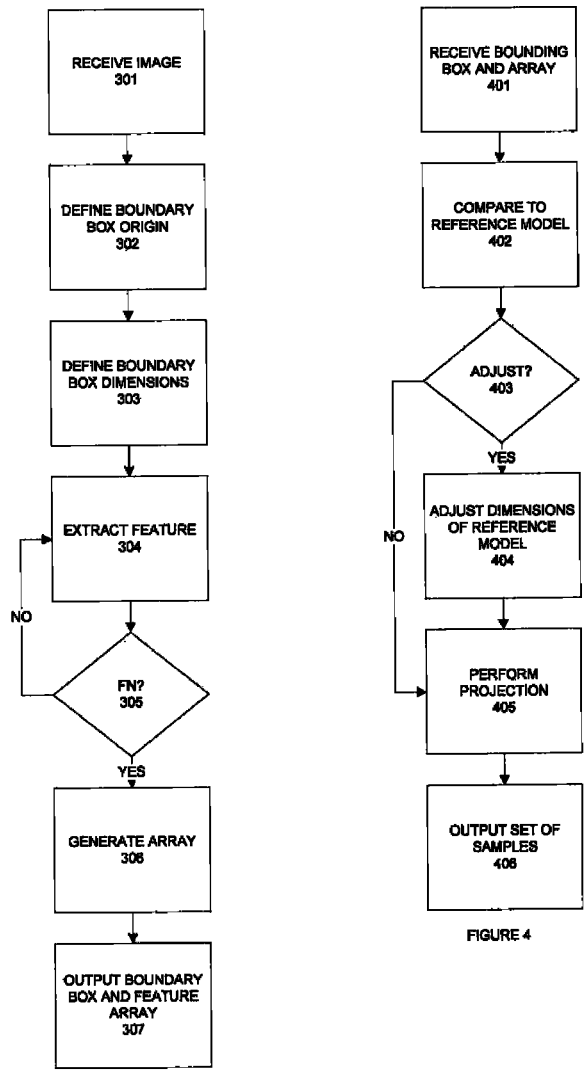

SYSTEMS AND METHODS FOR 3D POSE ESTIMATION

BACKGROUND

It is sometimes desired to allow a person to combine virtual reality with a real world surface. For example, a user may point the camera of a computer or smart-phone or tablet at a wall and the wall will appear on the display of the camera device. In addition, some virtual object will appear in the image as well, and appear as if it is part of the real world environment, such as, for example, a basketball hoop appearing to be affixed to the wall. The virtual content may include labels, 3D models, shading, illumination, and the like This is referred to as Augmented Reality ("AR"). In order for the view of the real world and the virtual scene to align properly (i.e. to be properly registered), the pose (i.e. 3D position and orientation) and other properties of the real and virtual cameras must be the same.

Estimating the pose of an object relative to the real world is a task of an AR system. Many different AR tracking methods and systems are available in the current art, including mechanical, magnetic, ultrasonic, inertial, and vision-based, as well as hybrid methods and systems, which combine the advantages of two or more technologies. The availability of powerful processors and fast frame-grabbers has made vision-based tracking methods desirable for various purposes due to their accuracy, flexibility, and ease of use.

When triggering an application in a camera on a certain surface in order to see augmented information on that surface it is possible to calculate the relative camera pose between the pose of the camera when the application was triggered to its poses in consecutive camera frames. When the information presented is 3D content it is useful to register the camera frames correctly (which are 2D by nature). Small errors in the 2D registration may be reflected in large misalignments of the 3D content.

The registration process used for Augmented Reality on planar surfaces is known as planar tracking or homography tracking. In the past, planar tracking or homography tracking has been done in contexts such as aligning different patches taken from space satellites. In Augmented Reality the goal in many cases is displaying 3D content registered in real time to a real world surface or environment. One prior art approach tries to identify strong local features in the image (such as corners) and track those local features as the camera is moving to register the image. With a sizable amount of local features on the real world surface, it is possible to track the plane reliably and in real time. The local features approach can only work on surfaces that are well textured which limits the usability of the application.

Another approach (sometime called the direct approach) tries to use all the pixels in the image and match between frames. The methods using the direct approach tend to be computationally intensive and are typically unable to deal with significant illumination changes. In addition, the approach has been limited in the number of degrees of freedom (DOF) that are available.

Six degrees of freedom registration means the relation between the camera and the planar surface on which information is being augmented is practically the full range of motions one can expect and in particular: moving the camera up and down, left and right, forward and backward and tilting it both in rotation and skewed angles with respect to the surface being imaged. The same applies the other way around meaning moving the surface with respect to the camera. 2DOF registration accommodates only for a limited set of motions and in particular up and down and left and right. Different degrees of freedom can be defined in between these two but only 6DOF supports the full set of motions that can be done in reality.

Fiducial-based vision-based tracking is popular in AR applications due to the simplicity and robustness that such tracking offers. In the prior art, fiducials are physical objects of predefined shape (and possibly size), and are usually integrated with an identification mechanism for uniquely recognizing individual fiducials. Fiducials are placed in a scene and the camera position is calculated according to their locations in the images.

Another approach is called Natural-Feature Tracking (NFT). NFT methods rely on certain features found in the real world. However, the natural features that can be used should have some easily identified and somewhat unique characteristics. Thus, NFT methods limits tracking to highly-textured objects or environments in which prominent scene features can be robustly and quickly located in each frame. NFT methods usually exhibit increased computational complexity compared with fiducial-based methods, as well as reduced accuracy, since little is assumed about the environment to be tracked. NFT methods are less obtrusive and can provide more natural experiences. Nevertheless, such methods are difficult to use for creating natural user-interfaces.

Planar shapes have also been used for tracking in the prior art. Ruiz et al. (hereinafter referred to as Ruiz 2006) (Alberto Ruiz, Pedro E. López de Teruel and Lorenzo Fernández, "Robust Homography Estimation from Planar Contours Based on Convexity", European Conference on Computer Vision, pp. 107-120, 2006.) proposed a projective approach for estimating the 3D pose of shape contours. An invariant-based frame construction is used for extracting projective invariant features from an imaged contour. The features are used for constructing a linear system of equations in homogeneous coordinates that yields the camera pose. Although theoretically general, the construction proposed in Ruiz 2006 limits the scope of usable shapes by several assumptions on shape concavities, and limits the use of the method in AR applications. In addition, only sparse features are used in Ruiz 2006 for pose estimation, with no error minimization step for increasing the accuracy of the pose estimated.

Iterative optimization has been shown to be useful for tracking, as well as for refining given pose estimates. Fitzgibbon (hereinafter referred to as Fitzgibbon 2001) (Andrew W. Fitzgibbon, "Robust registration of 2D and 3D point sets", In Proc. British Machine Vision Conference, volume II, pp. 411-420, 2001) proposed a 2D registration method for point sets based on the Levenberg-Marquardt nonlinear optimizer. As pointed out in Fitzgibbon 2001, direct nonlinear optimization on point sets can be easily extended to incorporate a robust estimator, such as a Huber kernel, which leads to more robust tracking. Such a method can also account for curves as sets of points, although the method makes no use of the connectivity information offered by such curves.

A shape footprint, originally proposed by Lamdan et al. (hereinafter referred to as Lamdan 1988) (Lamdan, Y., Schwartz, J. T., and Wolfson, H. J., "Object Recognition by Affine Invariant Matching", Computer Vision and Pattern Recognition, pp. 335-344, 1988.)), is a construction that can be used for calculating a signature for a shape. Shape footprints have been proposed for the recognition of flat and rigid objects undergoing affine transformations.

SUMMARY

The present system provides a tool to estimate the relative pose of a generic object with respect to a camera view-point by processing 2D images from a monocular camera in realtime. The capability of solving the pose estimation problem relies on the robust detection and matching in consecutive image frames of significant visual features belonging to an object of interest. To accomplish this, the system incorporates 3D modeling of the object of interest. In one embodiment, the shape of interest may be approximated by a parametric surface such as a cylinder, sphere, cube, ellipsoid, or even complex non-parametric models. The system can restrain information retrieved at a 2D image level to estimate parameters about the pose. In operation, the accuracy of the 3D pose estimation of the object is a function of the degree of approximation of the selected model and the ability to select and track relevant features across consecutive image frames.

These and further embodiments will be apparent from the detailed description and examples that follow.

BRIEF DESCRIPTION OF THE DRAWINGS

The present system is herein described, by way of example only, with reference to the accompanying drawings, wherein:

FIG. 1 illustrates the three actors of an embodiment of the system.

FIG. 2 is a flow diagram illustrating the operation of an embodiment of the system.

FIG. 3 is a flow diagram illustrating the feature extraction of an embodiment of the system.

FIG. 4 is a flow diagram illustrating pose estimation of an embodiment of the system.

DETAILED DESCRIPTION

Figure 5:
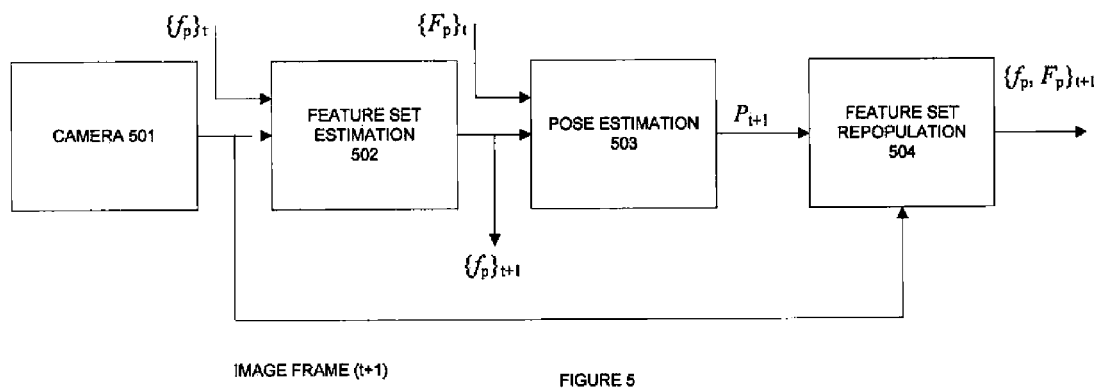
FIG. 5 is a block diagram of execution modules of an embodiment of the system.

The present system is a method of 3D pose estimation of an object using 3D modelling of an approximation of the object. The approximation may be parametric or non-parametric as desired.

The system is implemented by an acquisition system (e.g. camera) capturing an image (2D image plane) of an object in the 3D world. Each of these actors has its own coordinate system as illustrated in FIG. 1. Referring now to FIG. 1 we see the camera 101 creating an image 102 from an object 104 in the real world 103. The image 102 is a 2D image plane comprised of pixels and having a coordinate system having an origin 0,0 at the upper left in one embodiment, with rows 105 and columns 106 defining an image frame.

The camera 101 is a video camera in one embodiment and operates in 3D space with 6DOF in the $X_c, Y_c, Z_c$ coordinate system. The object of interest 104 is in the 3D real world and has a coordinate system in the $X_w, Y_w, Z_w$ coordinate system. The camera and real world coordinate systems are related since they are both in 3D Cartesian space.

The position and orientation of each of the actors is described by the displacement from the origin of the actor along the axes of its coordinate system. The origin may be taken anywhere in space. In one embodiment, the origin may be anchored to an easily identified location to optimize accuracy and ease of calculation. However, the origin can be defined anywhere without departing from the scope and spirit of the system.

The object of interest 104 is the object in the real world whose 3D pose is to be estimated. The object of interest is shown in this example as a cylinder, but in reality the object of interest may be any natural shape. In the system the shape of interest is modeled in as another object so that it can be constrained and allow for more accurate pose estimation.

The acquisition system in this embodiment is a camera 101 that can capture the 3D structure of the real world and transpose it onto a plane, referred to here as an image plane.

The image plane 102 represents the results of the camera acquisition/projection process. Formally, the image actor 102 is strictly related to the camera. In fact, the camera is the medium by which the image can be obtained as projection of the real-world. According the camera model, several projection may be considered (e.g., perspective, orthographic, and the like).

However, for the image plane 102, the reference system is strictly 2D, allowing locating a point in a plane with 2 coordinates, commonly referred to as row and columns. Also, the displacements are given in one embodiment as picture elements, commonly known as pixels, the smallest addressable elements in a display device.

The origin of the image system can be arbitrary taken anywhere on the image plane. A common choice is to center it on the top-left corner.

Because the actors are in different coordinate systems, the system must perform geometric transformations to move from one coordinate system to the next. A 3D roto-translation of the real world and the camera system can be identified. This transformation describes the displacement of the camera origin with respect to the world origin. Working in 3D coordinate systems, the transformation can be formally defined as a concatenation of a 3×3 rotation matrix R, and a 3×1 translation vector T. The 3×4 matrix can be finally obtained through concatenation, i.e., [R\T].

In order to obtain the location in the image of some real-world point, a further geometrical transformation is required, to normalize the different distance measures (i.e., meters and pixel) of the 3 actors. This transformation is given by the so called camera matrix, also referred to as K This 3×3 matrix encompass all the technical camera information (i.e., intrinsic camera parameters) allowing the projection and transposition of a point in real-world system to the image plane. These parameters are in particular the camera focal length, the pixel dimension at sensor level, and the camera central point. In order to obtain this matrix a procedure referred to as calibration has to be carried out. Several techniques are available for the estimation of the camera matrix K and for purposes of one embodiment of the system, it can be assumed that K is given or known.

The process by which a 3D point in the real-world is brought to the image plane through the camera is called projection, and will be referred to as P. In one embodiment, P can be defined as product between the matrix K, and the 31) roto-translation between the camera and the real-world. Mathematically, P=K[R\T].

In FIG. 1, a schematic reconstruction of the actor is reported, along with the geometric transformations required to go from one reference system to each of the others.

Representing all the quantities in homogeneous coordinates, given a point $X=(\lambda_x, \lambda_y, \lambda_z, 1)$ in the real-world, its projection in the image plane $x=(\lambda_r, \lambda_c, 1)$ can be found according the formula x=s PX, where the transformation is given up to a scaling factor s.

FIG. 2 is a flow diagram illustrating the operation of the system in one embodiment. At step 201 the camera generates an image of the real world, including the object of interest, referred to as O.

At step 202 the system extracts features from the image in order to generate a set of N image points $x_t$ belonging to the object O.

At step 203 the extracted features are used to generate a 3D projection of the image points $x_t$ onto a reference model of the object $O_R$.

At step 204 the 3D projection is used to generate a pose estimation of the object of interest. Using the image points on the object O, a 3D model for approximating the image O, and the camera matrix K, we can estimate a pose of the object O as using matrix $P=K[R\backslash T]$.

Feature Extraction

The feature extraction step 202 of FIG. 2 phase allows the system to detect robust 2D patches of the object of interest. The patches should be such that it is possible to locate the object in different time instants (i.e. different image frames). In order to determine the presence in the scene of the object of interest, a classification process may be run. Alternatively, other procedures can be activated with the final aim of defining a bounding box containing the object in the image plane.

In one embodiment, the feature extraction is a 'blind' procedure, where features are extracted regardless their physical meaning in the real-world and without a-priori knowledge of the object of interest. This allows the system to abstract from the nature of specific object, allowing the procedure to be applied to a wider range of scenarios. In other embodiments, where there is pre-knowledge of the specific object of interest, further information can be exploited to detect robust features (e.g., in face tracking it is possible to consider relevant facial features, such as eyes, nose, lips, and rely on their geometrical constraints to achieve a better detection and tracking).

The system may be used with the a number of feature type and/or extraction techniques, including, but not limited to, corners, SIFT, SURF, or whatever other image feature that is possible to accurately locate object features in consecutive or non-consecutive image frames.

The output of the feature extraction operation is a Bounding Box B of the object in the image plane along with an array of features or feature elements. The Bounding Box B is a rectangle in one embodiment with an origin point $B_p=(\lambda_r, \lambda_c)$ defined in the image plane (with dimensions in rows and columns and expressed in pixels) being h and w, respectively. Thus the bounding box B is $(B_p, w, h)$.

The features are defined as an array $\{f_p\}_t$, where p goes from 1 to FN and indexes the number of features found (e.g. FN), and t is a temporal index (i.e, which image frame is being analyzed). Each array element $f_p=(\lambda_r, \lambda_c, 1)$ locates in the image coordinates system each of the features found within the bounding box B.

FIG. 3 is a flow diagram illustrating the feature extraction step 202 of FIG. 2. At step 301 the system receives another image frame at time t that includes the object of interest O. At step 302 the system defines the origin point $B_p$ of the bounding box B. At step 303 the dimensions h and w of the bounding box B are determined.

At step 304 the system finds features f within the bounding box B. At decision block 305 it is determined if there are more features to extract (e.g. has FN been reached). If so, the system returns to step 304. If not, the system proceeds to step 306 and generates the feature array $\{f_p\}_t$. At step 307 the system outputs the boundary box and the feature array.

Projection

After the boundary box and feature set array have been generated, the system generates a projection of the feature set to locate the features onto the 3D reference model $O_R$. In the example of FIG. 1, the model is cylindrical, but this is for purposes of example only. The reference model may be spherical, cylindrical, cubic, or some other parametric or non-parametric surface.

The projection of the image feature points $\{f_p\}_t$, in the 3D real-world space is carried out relying on the adopted 3D reference model $O_R$, and the bounding box B obtained in FIG. 3.

In one embodiment, an orthographic projection is performed when bringing the 2D image feature points to the 3D object model. In this context, in order to simplify the calculations, the dimensions of the reference model can be adjusted so as to fit the bounding box B (e.g., if the model is a cylinder, and the bounding box is a rectangle with width and height of w and h, respectively, the cylinder height may be set to h, while its radius to w/2). Whenever a non-parametric model is considered, this procedure can be thought of as an over-quantization of the model surface. Also, the real-world reference system can be translated to some convenient location (i.e., the center of the considered 3D model).

The output of this process is a set of samples $\{F_p\}_t$ in the real world coordinate system corresponding to the 2D image feature found at in the extraction step described above. It should be noted that other methods to project the feature array onto the reference model may be used without departing from the scope or spirit of the system.

FIG. 4 is a flow diagram illustrating an embodiment of this process. At step 401 the system receives the bounding box B and the array $\{f_p\}_t$, from the feature extraction process. At step 402 the system compares the bounding box dimensions to the reference model $O_R$. At decision block 403 it is determined if any adjustment or normalizing of the reference model dimensions is needed. If so, the dimensions are modified at step 404. If not, the system proceeds to step 405 and does an orthographic projection of the feature points onto the model.

At step 406 the system outputs the set of samples $\{F_p\}_t$ in the real world coordinate system.

Pose Estimation

Once the projection process has been carried out, a set of pairs of 2D feature samples in the image plane $\{f_p\}$, and the corresponding 3D points $\{F_p\}$, in the real-world coordinate system can be established (i.e. the correspondences are pairs of $\{f_p, F_p\}$)

These correspondences, together with the camera matrix K, allow the effective estimation of the initial 3D object pose P with respect to the camera reference system. These sets of parameters are taken as reference for the successive processing steps and calculations. In fact several reference systems can be taken, also in non-Cartesian spaces (i.e., spherical), according to the algorithmic simplification that each system may offer in a particular case In this embodiment, the only parameter required for the pose estimation is the camera focal length. Concerning the core of the pose estimation algorithm, possible strategies include, but are not limited to, POSIT and SolvePnP. These are particular methods allowing the effective approximation of the object pose relying on iterative procedures, and approximate projection paradigms. The output of the pose estimation process is the pose at a point in time (based on the frame) $P_t=[R\backslash T]$ In one embodiment, the system operates as shown in FIG. 5. The example of FIG. 5 is after at least the first image frame has been processed. The camera 501 provides the next image frame from time t+1 to the Feature Set 2D Motion Estimation Block 502. The feature array $\{f_p\}_t$ from the prior frame is also provided as input to the Feature Set 2D Motion Estimation Block 502.

The Feature Set 2D Motion Estimation Block 502 uses the image frame t+1 and the prior feature array $\{f_p\}_t$ to generate the new feature array $\{f_p\}_{t+1}$. This operation is based on the assumption that sufficient of the previously identified features $\{f_p\}_t$ of frame t can be identified in new frame t+1. This will be true if inter-frame motion is small enough. The operation of Block 502 may employ any of several methods, alone or in combination, including optical flow, feature matching, and the like. The generated output is a set of new locations $\{f_p\}_{t+1}$ that represent the motion of each feature from the prior set $\{f_p\}_t$. The number of features that it is possible to locate across frames is q where q varies from 1 to Q and Q LTE FN.

In operation, it should be noted that in some instances, not all of the features can be located across consecutive frames, regardless their robustness (e.g., in case of occlusion with other objects, or self-occlusions, and the like). Although a percentage of starting feature set $\{f_p\}_t$ may not be tracked in the frame t+1, a number of pairs $\{f_q, F_q\}_{t+1}$ can be found.

It is important to note that $\{F_p\}_t = \{F_p\}_{t+1}$ since the real-world reference system is moving together with the model O. This implies that $\{F_q\}_{t+1}$ is a subset of $\{F_p\}_{t+1}$.

The output $\{f_p\}_{t+i}$, along with the real world sample points $\{F_p\}_t$ from the previous image frame, are provided to the Pose Estimation Block 503. The Pose Estimation Block 503 uses this data to generate the new pose $P_{t+1}$ for the latest frame. Typically, the Pose Estimation Block 503 will use $\{F_q\}_{t+1}$ and $\{f_q\}_t$ as the determined features and points may be less than the number from the prior frame.

The new pose $P_{t+1}$ is provided to the Feature Set Repopulation Block 504, along with the current image frame t+1. The Feature Set Repopulation Block 504 generates the new correspondence pairs $\{f_p, F_p\}_{t+1}$ that can be used for the next operation when the next image frame is acquired.

The purpose of the Feature Set Repopulation Block 504 is to maintain a consistent number of pairs of feature points across image frames t and t+1. To that end, the Feature Set Repopulation Block 504 extracts a new set of image features $\{nif_n\}_{t+1}$ where n varies from 1 to FN-Q. These new features are extracted from the current frame to maintain a consistent number with the prior frame.

The pose P(t+1) of the object O has already been estimated in the t+1 frame. Thus, the projection step can accurately locate the new feature set in the 3D model, obtaining $\{F_n\}_{(t+1)}$. This allows the problem of lost features to be overcome and allows the system to work with the same number of features FN.

The ultimate output of the system is an array of pairs $\{f_p, F_p\}_{t+1}$ where the feature set $\{f_p\} = \{f_q\}_{t+1} \{nif_n\}_{(t+1)}$, while $F_p = \{F_q\}_t + \{F_n\}_{(t+1)}$. In other words, the feature set at time t+1 is a composition of the features found at time t that also are found in time t+1 and a new set of features that has been retrieved in the frame at time t+1.

In the same manner, the 3D points in the real world are given by the projections at time t of $\{f_q\}_{(t+1)}$ (unchanged since they refer to the real world reference system) and the projections in the real world of the feature set $\{nif_n\}_{(t+1)}$ that are obtained from the feature extraction step while considering the pose $P_{t+1}$ of the new frame.

At this point, the number of available correspondence pairs $\{f_p, F_p\}$ where p is from 1 to FN is available.

Figure 6:
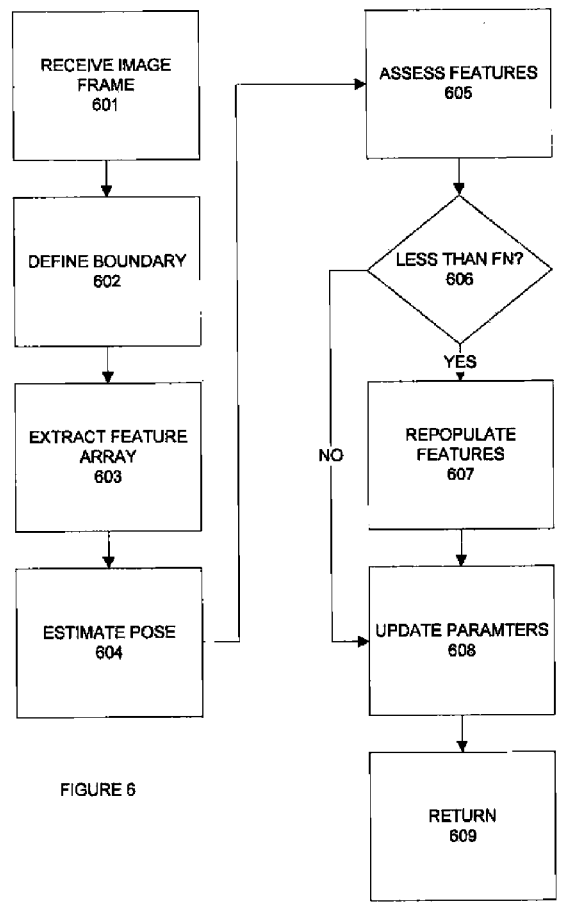
FIG. 6 is flow diagram of the operation of an embodiment of the system with feature repopulation.

FIG. 6 is a flow diagram illustrating the operation of an embodiment of the system. At step 601 the system receives the new image frame. At step 602, the system receives the next image frame. At step 602 the system uses the prior array data and other parameters to define the boundary box and to extract features from the new frame at step 603. At step 604 the system uses the extracted features, boundary box, and prior real world sample points to perform a pose estimation of the model.

At step 605 the system assesses the extracted features and at decision block 606 it is determined if the extracted features are less than FN. If so, the system repopulates the features accordingly at step 607. After step 607, or if there are enough features at step 606, the system updates the parameter that will be used for the next incoming image frame and returns at step 609 to receive the next image frame.

Embodiment of Computer Execution Environment (Hardware)

Figure 7:
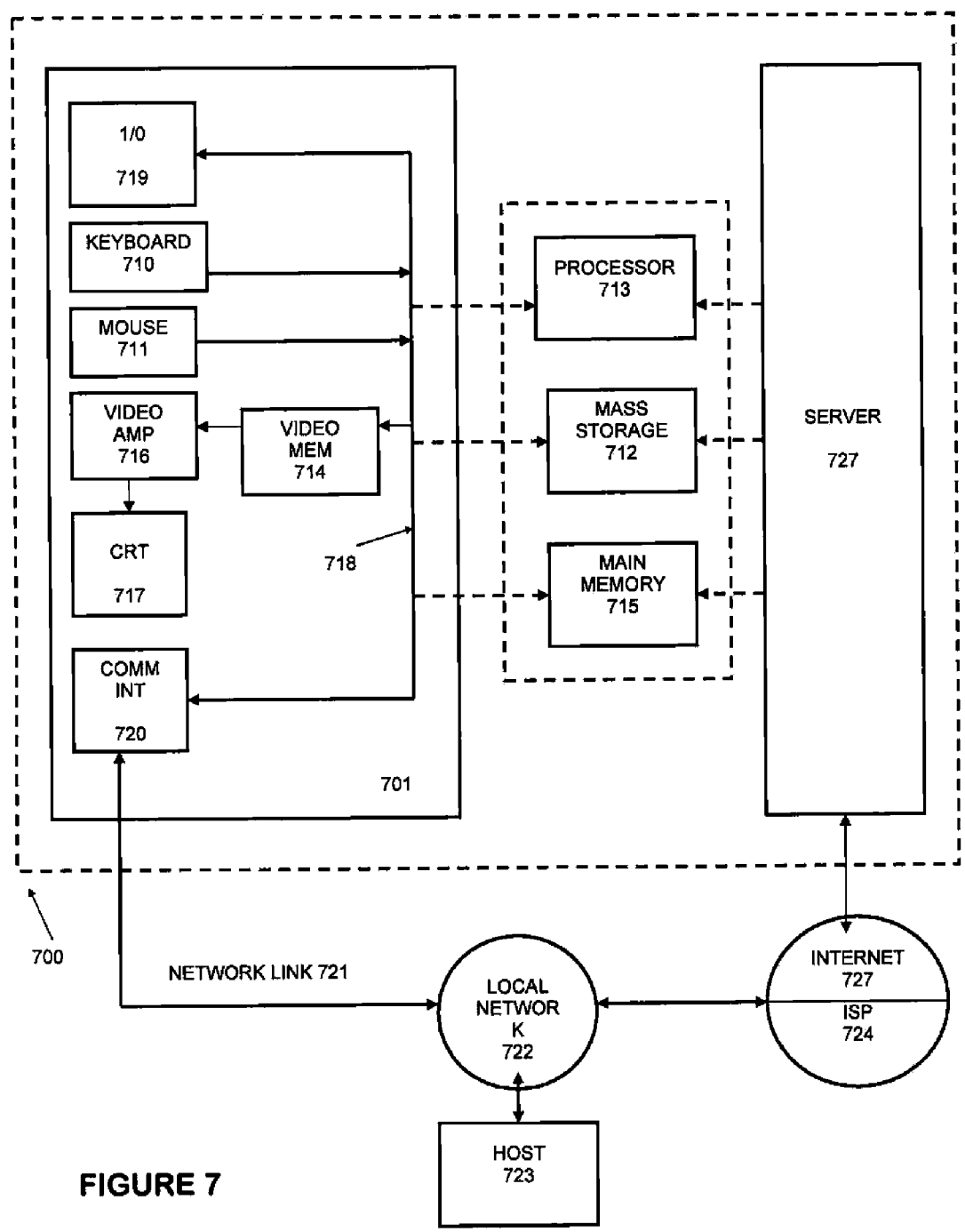
FIG. 7 is an example computer embodiment of the system.

An embodiment of the system can be implemented as computer software in the form of computer readable program code executed in a general purpose computing environment such as environment 700 illustrated in FIG. 7, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 710 and mouse 711 are coupled to a system bus 718. The keyboard and mouse are for introducing user input to the computer system and communicating that user input to central processing unit (CPU 713. Other suitable input devices may be used in addition to, or in place of, the mouse 711 and keyboard 710. I/O (input/output) unit 719 coupled to bi-directional system bus 718 represents such I/O elements as a printer, A/V (audio/video) I/O, etc.

Computer 701 may be a laptop, desktop, tablet, smartphone, or other processing device and may include a communication interface 720 coupled to bus 718. Communication interface 720 provides a two-way data communication coupling via a network link 721 to a local network 722. For example, if communication interface 720 is an integrated services digital network (ISDN) card or a modem, communication interface 720 provides a data communication connection to the corresponding type of telephone line, which comprises part of network link 721. If communication interface 720 is a local area network (LAN) card, communication interface 720 provides a data communication connection via network link 721 to a compatible LAN. Wireless links are also possible. In any such implementation, communication interface 720 sends and receives electrical, electromagnetic or optical signals which carry digital data streams representing various types of information.

Network link 721 typically provides data communication through one or more networks to other data devices. For example, network link 721 may provide a connection through local network 722 to local server computer 723 or to data equipment operated by ISP 724. ISP 724 in turn provides data communication services through the world wide packet data communication network now commonly referred to as the "Internet" 727 Local network 722 and Internet 727 both use electrical, electromagnetic or optical signals which carry digital data streams. The signals through the various networks and the signals on network link 721 and through communication interface 720, which carry the digital data to and from computer 700, are exemplary forms of carrier waves transporting the information.

Processor 713 may reside wholly on client computer 701 or wholly on server 727 or processor 713 may have its computational power distributed between computer 701 and server 727. Server 727 symbolically is represented in FIG. 7 as one unit, but server 727 can also be distributed between multiple "tiers". In one embodiment, server 727 comprises a middle and back tier where application logic executes in the middle tier and persistent data is obtained in the back tier. In the case where processor 713 resides wholly on server 727, the results of the computations performed by processor 713 are transmitted to computer 701 via Internet 727, Internet Service Provider (ISP) 724, local network 722 and communication interface 720. In this way, computer 701 is able to display the results of the computation to a user in the form of output.

Computer 701 includes a video memory 714, main memory 715 and mass storage 712, all coupled to bi-directional system bus 718 along with keyboard 710, mouse 711 and processor 713.

As with processor 713, in various computing environments, main memory 715 and mass storage 712, can reside wholly on server 727 or computer 701, or they may be distributed between the two. Examples of systems where processor 713, main memory 715, and mass storage 712 are distributed between computer 701 and server 727 include thin-client computing architectures and other personal digital assistants, Internet ready cellular phones and other Internet computing devices, and in platform independent computing environments, The mass storage 712 may include both fixed and removable media, such as magnetic, optical or magnetic optical storage systems or any other available mass storage technology. The mass storage may be implemented as a RAID array or any other suitable storage means. Bus 718 may contain, for example, thirty-two address lines for addressing video memory 714 or main memory 715. The system bus 718 also includes, for example, a 32-bit data bus for transferring data between and among the components, such as processor 713, main memory 715, video memory 714 and mass storage 712. Alternatively, multiplex data/address lines may be used instead of separate data and address lines.

In one embodiment of the invention, the processor 713 is a microprocessor such as manufactured by Intel, AMD, Sun, etc. However, any other suitable microprocessor or microcomputer may be utilized, including a cloud computing solution. Main memory 715 is comprised of dynamic random access memory (DRAM). Video memory 714 is a dual-ported video random access memory. One port of the video memory 714 is coupled to video amplifier 719. The video amplifier 719 is used to drive the cathode ray tube (CRT) raster monitor 717. Video amplifier 719 is well known in the art and may be implemented by any suitable apparatus. This circuitry converts pixel data stored in video memory 714 to a raster signal suitable for use by monitor 717. Monitor 717 is a type of monitor suitable for displaying graphic images.

Computer 701 can send messages and receive data, including program code, through the network(s), network link 721, and communication interface 720. In the Internet example, remote server computer 727 might transmit a requested code for an application program through Internet 727, ISP 724, local network 722 and communication interface 720. The received code maybe executed by processor 713 as it is received, and/or stored in mass storage 712, or other non-volatile storage for later execution. The storage may be local or cloud storage. In this manner, computer 700 may obtain application code in the form of a carrier wave. Alternatively, remote server computer 727 may execute applications using processor 713, and utilize mass storage 712, and/or video memory 715. The results of the execution at server 727 are then transmitted through Internet 727, ISP 724, local network 722 and communication interface 720. In this example, computer 701 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. In other embodiments, the system may be implemented on any suitable computing environment including personal computing devices, smart-phones, pad computers, and the like. An embodiment of the invention may be implemented in any type of computer system or programming or processing environment.

While the system has been described with respect to a limited number of embodiments, it will be appreciated that many variations, modifications, and other applications of the system may be made.

What is claimed is:

1. A method for three-dimensional (3D) pose estimation comprising:
receiving, from a camera, a first image at time t that includes an object of interest;
extracting FN features from the object in the first image to generate a first feature array $\{f_p\}_t$;
projecting the FN features onto a 3D model of the object to generate a first 3D sample point array $\{F_p\}_t$;
estimating an initial pose $P_t$ of the object from the first feature array $\{f_p\}_t$ and the first 3D sample point array $\{F_p\}_t$;
receiving, from the camera, a second image at time t+1 that includes the object;
identifying Q (Q≤FN) features $\{f_q\}_{t+1}$ in the second image that are also present in the first feature array $\{f_p\}_t$;
estimating a new pose $P_{t+1}$ of the object from the Q features $\{f_q\}_{t+1}$ identified in the second image that are also present in the first feature array $\{f_p\}_t$, and from Q sample points $\{F_q\}_t$ in the first 3D sample point array $\{F_p\}_t$ corresponding to the Q features $\{f_q\}_{t+1}$;
extracting N (N=FN-Q) new features $\{nif_n\}_{t+1}$ of the object from the second image that are not present in the first image;
projecting the N new features $\{nif_n\}_{t+1}$ onto the 3D model of the object to generate N new sample points $\{F_n\}_{t+1}$;
generating, for subsequent pose estimation, a second feature array $\{f_p\}_{t+1}$ that consists of the Q features $\{f_q\}_{t+1}$ found in the second image that are also present in the first feature array $\{f_p\}_t$, and the N new features $\{nif_n\}_{t+1}$ extracted from the second image; and
generating, for subsequent pose estimation, a second 3D sample point array $\{F_p\}_{t+1}$ that consists of the Q sample points $\{F_q\}_t$ from the first 3D sample point array $\{F_p\}_t$, and the N new sample points $\{F_n\}_{t+1}$.

* * * * *